(No Model.)
W. F. STEVENS.
BICYCLE.
No. 390,916. Patented Oct. 9, 1888.
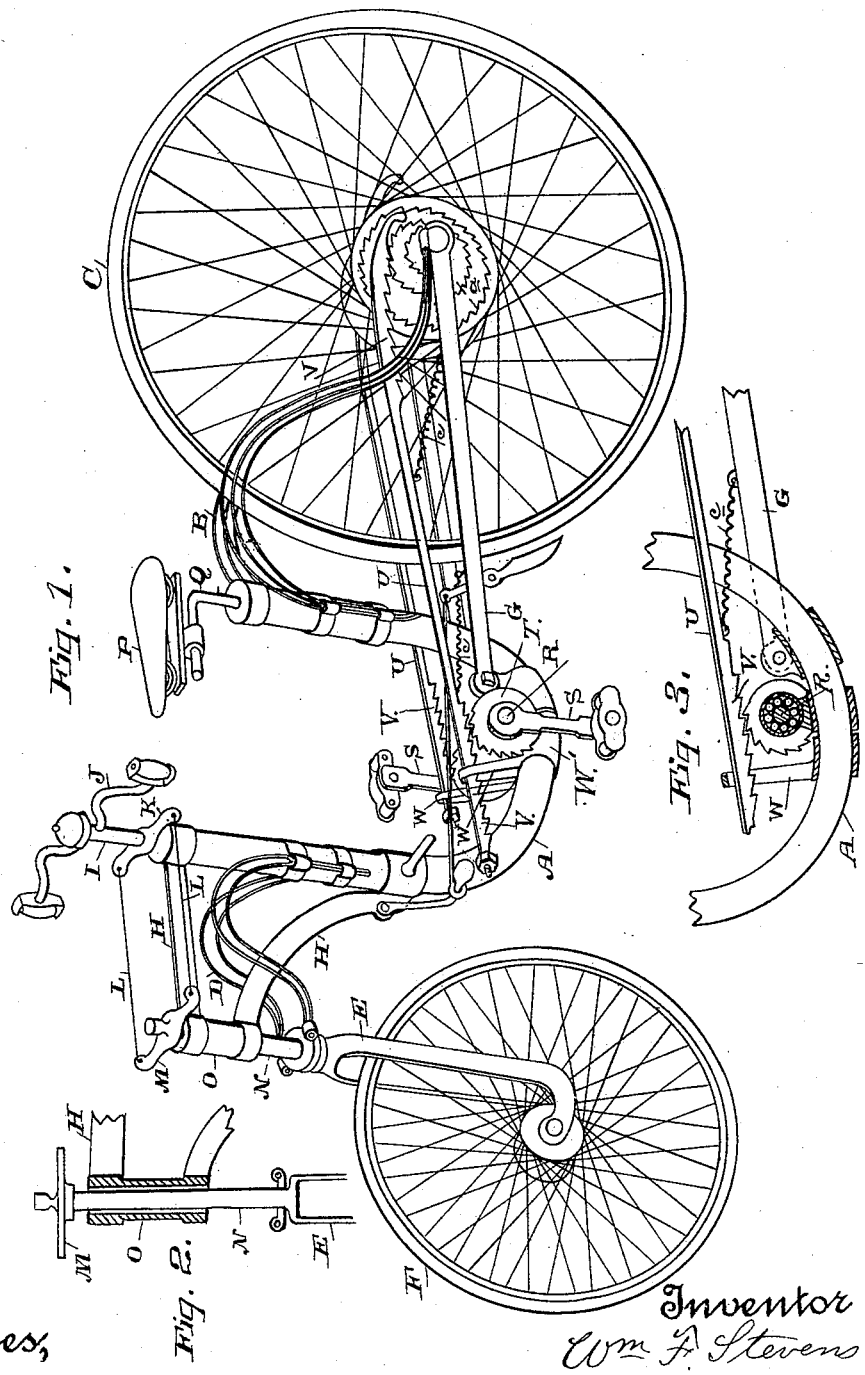
Witnesses,
Geo. H. Strong.
J. H. Rouse.
Inventor,
Wm. F. Stevens.
By Dewey & Co
atty

UNITED STATES PATENT OFFICE.

WILLIAM F. STEVENS, OF SAN FRANCISCO, CALIFORNIA.

BICYCLE.

SPECIFICATION forming part of Letters Patent No. 390,916, dated October 9, 1888.

Application filed February 21, 1888. Serial No. 264,872. (No model.)

*To all whom it may concern:*

Be it known that I, WILLIAM F. STEVENS, of the city and county of San Francisco, State of California, have invented an Improvement in Bicycles; and I hereby declare the following to be a full, clear, and exact description of the same.

My invention relates to certain improvements in bicycles. It consists in certain improvements in the frame, a novel arrangement of springs by which the same is suspended and connected with the wheels, a novel driving mechanism, and certain details of construction, all of which will be more fully explained by reference to the accompanying drawings, in which—

Figure 1 is a perspective view of my machine. Fig. 2 is a detail showing the pivot of the bar H. Fig. 3 is a detailed sectional view showing the bracket for supporting the driving-gear, one of the rods U, and spring c, and the guide W for the rod.

A is the main frame of the machine, which is made tubular and in the form of the letter U, as shown. From the rear portion of the frame curved or scroll-shaped springs B extend backward, having their rear ends attached to the journal-boxes in which the shaft of the rear wheel, C, rotates, and from the front portion of this frame A similar curved springs, D, extend forward, and are secured to the top of the front fork, E, in which the front wheel, F, revolves. From the rear wheel journal-boxes upon either side links or forks G extend forward and are fulcrumed to the frame A in close proximity to the driving crank-shaft, and these levers or forks, while allowing the wheel to move with relation to the frame A in compliance with the action of the spring, serve to retain the wheel at approximately the same distance from the frame and keep it rigid, preventing side movements, while allowing vertical motion. From the front portion of the frame other arms or bars, H, extend, and have their upper ends formed with or secured to the post O, in which the extension of the steering-fork moves. In the present case I have shown the vertical steering-post I, having the handles J and a cross-bar, K, from which rods or wires L extend to the similar cross-bar, M, upon the head of the steering post or shaft N, which passes through and turns within the sleeve O. The saddle P is secured to the rod Q, being adjustable forward or back upon the horizontal portion of the rod, while the vertical portion of the rod is adjustable up and down within the rear portion of the tubular frame A, being held at any point of adjustment by the set-screw in the usual manner. The driving mechanism of this machine is peculiar.

R is a shaft having the cranks S upon its opposite ends, with the usual pedals by which they are operated by the feet of the rider. Inside of the cranks and secured upon the shaft, which is journaled in the bottom of the frame A, are disks or wheels T, each having a little more than half of its periphery cut into ratchet-teeth, and these wheels are so fixed on the shaft that the ratchet-teeth upon one correspond with the plain portion of the circumference of the other.

U are rods, the forward and rear ends of which have ratchet-teeth formed in them, as shown at V. The ratchet-teeth in the front ends of these rods engage with those upon the disk T on the crank-shaft, so that when the crank-shaft is rotated the action of the toothed disks will be to draw the rods forward.

W are guides projecting from a bracket, W', and through which the front ends of the rods slide, so as to keep them in proper position with relation to the toothed disk. Upon the rear-wheel axle and upon each side outside the hubs are fixed the ratchet-wheels a, preferably of two or more different sizes. These wheels may each have a slight flange outside of the ratchet-teeth, and the rear ends of the connecting-rods U are toothed so as to engage the teeth of either of these wheels upon which they may rest.

The operation will then be as follows: When the pedal-shaft is rotated, the teeth of the disk T upon one side will engage with the ratchet-teeth upon the connecting-rod of that side, and will draw it forward during half the rotation, or a little more, of the crank-shaft. The teeth upon the rear end of this connecting-rod engaging with the ratchet-wheel a upon the rear axle will draw it forward, causing the rear wheel to rotate. As soon as the pedal has reached its lowest point, the pedal at the opposite side arriving at the top, and being in position to be rotated by the foot of the rider, will engage with the rod upon that side and a similar action will take place upon the rear ratchet-wheel, *a*, upon that side. At the same time the plain portion of the first-named toothed disk of the crank-shaft arriving beneath the ratchet-teeth, the springs *c*, attached to the toothed connecting-bar and some portion of the frame, will immediately draw the connecting-bar back to its first position, ready to be again engaged by the teeth when the disk is rotated to the proper point. By this alternate action of the toothed disk and the connecting-rods a continuous rotary motion of the driving-wheel is produced.

By employing two or more different sizes of toothed ratchet-wheels *a* upon each end of the rear axle I am enabled to regulate the power of the machine to suit the character of the work to be done. When it is necessary to ascend hills or travel through heavy roads, the rear end of the connecting-rod is shifted to the largest of the ratchet-wheels, thus increasing the power; but on very smooth or easy roads the connecting-rod may be shifted to the smallest of these ratchet-wheels, thus gradually increasing the speed of revolution.

By the construction of the frame A here shown it will be obvious that a two-wheeled machine may be used by ladies as well as gentlemen, the shape of the frame avoiding entirely the objectionable feature of the usual connecting-perch or backbone.

Having thus described my invention, what I claim as new, and desire to secure by Letters Patent, is—

1. A bicycle composed of the front and rear wheels, the vertical U-shaped frame A, with the links connecting it with the front and rear wheels, in combination with the springs connecting the front and rear portions of the frame A with the front and rear wheels, respectively, substantially as herein described.

2. The crank-shaft journaled upon the frame of the bicycle, having the semi-toothed disks secured to it, in combination with the correspondingly-shaped toothed connecting-rod, the rear end of which is also toothed, and the toothed wheels or disks upon the axle of the rear driving-wheel, substantially as herein described.

3. The crank-shaft having disks provided with ratchet-teeth around half of their circumference, two or more ratchet-wheels of different sizes upon each end of the rear axle-shaft, in combination with the rod having its front and rear ends toothed and so guided as to engage with the ratchet-disk upon the crank-shaft and rear axle, and the returning-springs *c*, substantially as herein described.

In witness whereof I have hereunto set my hand.

WILLIAM F. STEVENS.

Witnesses:
S. H. NOURSE,
H. C. LEE.